Figure 1:
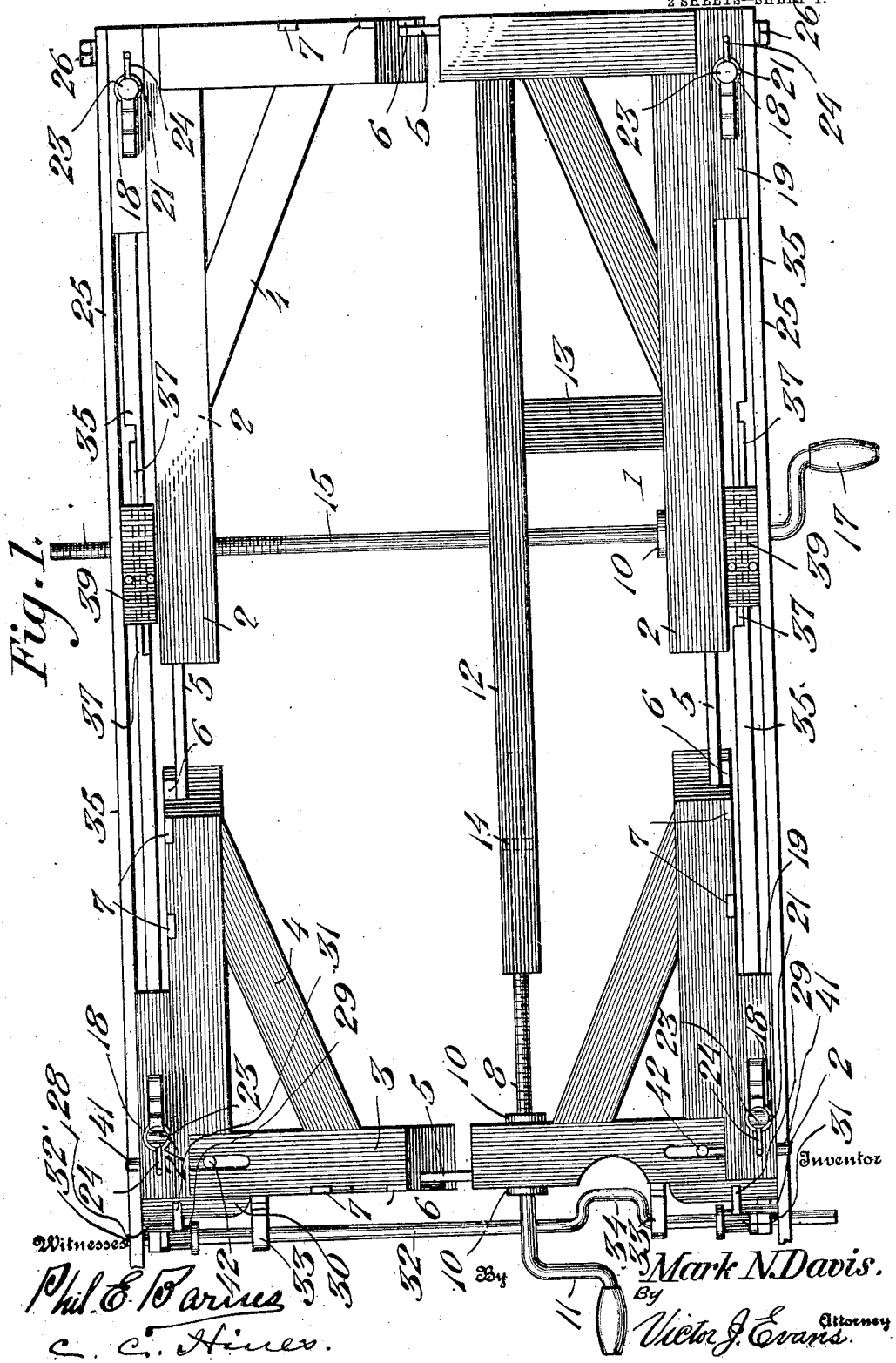

No. 851,588. PATENTED APR. 23, 1907.
M. N. DAVIS.
VEHICLE SUPPORT.
APPLICATION FILED JUNE 20, 1906.

2 SHEETS—SHEET 1.

Witnesses
Phil. E. Barnes
C. C. Hines.

Inventor
Mark N. Davis.
By
Victor J. Evans.
Attorney

No. 851,588. PATENTED APR. 23, 1907.
M. N. DAVIS.
VEHICLE SUPPORT.
APPLICATION FILED JUNE 20, 1906.
2 SHEETS—SHEET 2.
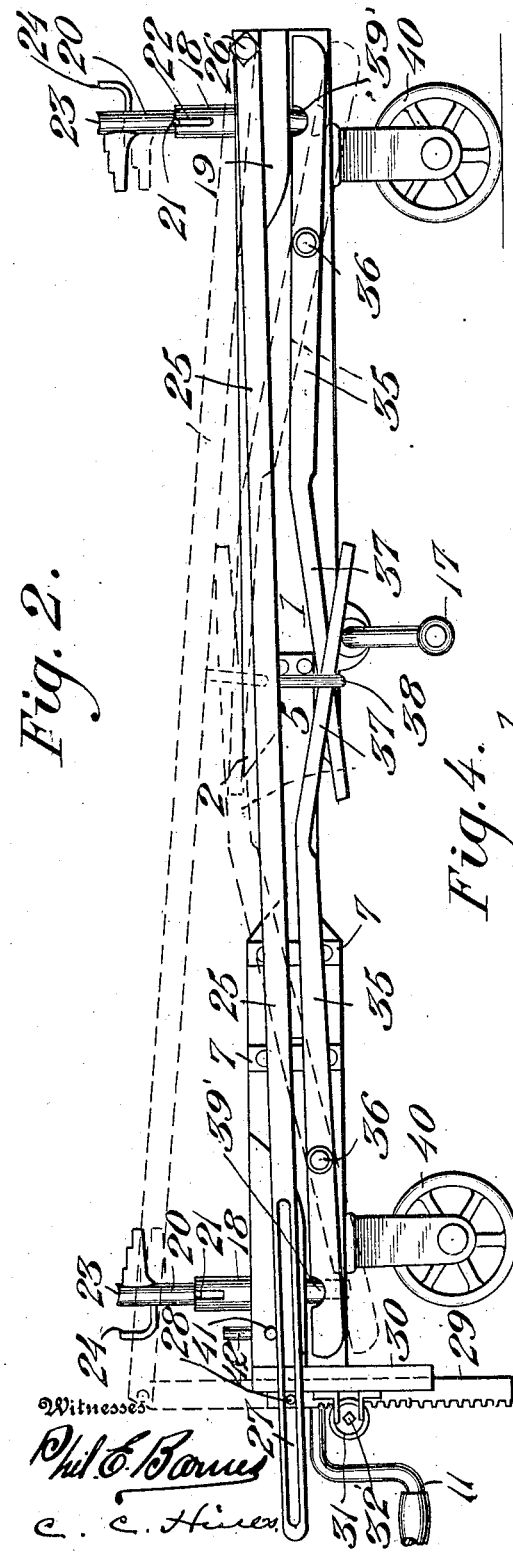
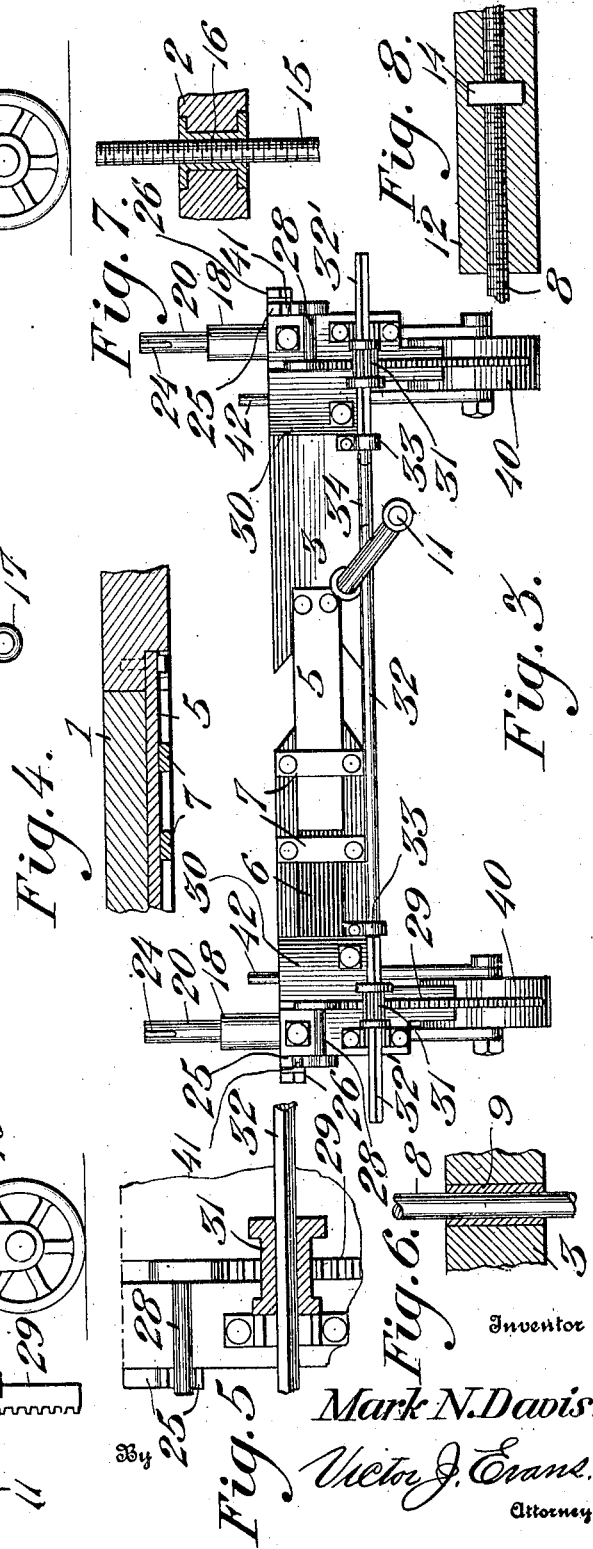

UNITED STATES PATENT OFFICE.

MARK N. DAVIS, OF BALTIMORE, MARYLAND.

VEHICLE-SUPPORT.

No. 851,588.     Specification of Letters Patent.     Patented April 23, 1907.

Application filed June 20, 1906. Serial No. 322,649.

*To all whom it may concern:*

Be it known that I, MARK N. DAVIS, a citizen of the United States of America, residing at Baltimore city, State of Maryland, have invented new and useful Improvements in Vehicle-Supports, of which the following is a specification.

This invention relates to vehicle supports, and particularly to a jack or device for supporting automobiles, wagons, carriages and other vehicles, the object of the invention being to provide a device of this character whereby the vehicle may be bodily supported and jacked for the removal of its wheels for convenient lubrication of the axle spindles, for convenience in making repairs and for other purposes, and whereby the vehicle may also be bodily turned to dispose the different portions thereof to better light or advantage in carrying out the foregoing operations and in painting, washing or carrying out other like operations in building, repairing and cleaning vehicles.

Another object is to provide a device of this character which is readily adjustable to support vehicles of different sizes.

With the above and other objects in view, the invention consists of the novel features of construction, combination and arrangement of parts hereinafter fully described and claimed, reference being had to the accompanying drawings, in which:—

Figure 1 is a top plan view of the jack or support showing the same longitudinally extended. Fig. 2 is a side elevation thereof showing the different positions of the elevating means in full and dotted lines. Fig. 3 is an end elevation showing the device laterally extended. Fig. 4 is a fragmentary longitudinal section showing the sliding connection between the members of one of the rails thereof. Fig. 5 is a detail view showing one of the racks and the associated pinion of the elevating mechanism. Fig. 6 is a detail showing the journal bearing construction for the adjusting shafts. Fig. 7 is a detail view showing the threaded adjusting means of the transverse adjusting shaft. Fig. 8 is a similar view showing the threaded adjusting means of the longitudinal adjusting shaft.

Referring to the drawings, the numeral 1 designates the frame of the device which comprises a platform adapted to support the vehicle, and on which the vehicle may be run in any preferred manner. This platform is preferably rectangular in form and of skeleton type, being composed of side rails 2 and end rails 3 connected at the corners by suitable braces 4 and otherwise suitably bolted or connected together. The side rails 2 constitute tracks or runways on which the wheels of the vehicle bear when the vehicle is in position on the platform. Both the side and end rails of the platform are of sectional construction, the parts or members thereof being slidably connected, so that the platform may be extended either longitudinally or laterally or in both directions to vary its size to receive and support vehicles of different lengths and widths. The sliding connections may be of any preferred type, but in the construction shown one of the members of each rail is provided with a tongue or guide plate 5 which slides in a grooved guideway 6 in the other member and is retained in position by keeper strips 7. The inner end of one of the members is V-shaped to fit within the correspondingly V-recessed end of the other member, as clearly shown in Fig. 3, to form a lap joint insuring a firm connection when the members are closed together. The platform may be manufactured in practice of wood or metal or may be of a composite structure.

In order to adjust the platform longitudinally, a shaft 8 is provided which is journaled in a bearing 9 in one of the end rails and is held from longitudinal movement by collars 10. This shaft is provided at its outer end with a crank handle 11 and has its inner end threaded and arranged to move longitudinally in a socket in a bar 12 extending from the other end rail and reinforced from the adjacent side rail by a brace 13, the said threaded end of the shaft engaging a nut 14 fixed against rotation and longitudinal movement in the socket, whereby the adjustment of the shaft in one direction or the other will longitudinally extend or contract the platform for supporting vehicles of different lengths. Lateral adjustment of the platform is secured by the use of a transverse shaft 15 journaled in a bearing similar to the aforesaid bearing 9 in one of the side rails and operating in a bearing 16 fixed in the other side rail, the shaft and bearing having a screw threaded engagement, as shown in Fig. 7. The shaft is provided with a crank handle 17 whereby it may be turned in one direction or the other to vary the width of the platform for the reception of different widths of vehicles.

At the corners of the platform are vertical tubular guides 18 which extend through lateral extensions 19 of the side rails and in which are slidably mounted jack posts 20. Each of these posts is provided with a pin 21 movable in a slot 22 in the guide to hold it from turning therein and is provided at its upper end with a notch or recess for the reception of the adjacent end of the vehicle axle. From the post projects a hooked hanger 24 on which the axle may be supported in those constructions where the axle is provided with a brace which prevents it from being directly seated in the notch 23. If desired, the usual stepped support may be provided upon each post in lieu of the seat notch.

Arranged upon each side of the platform is a main operating lever 25 pivoted at one end to one of the extensions 19 of the adjacent side rail, as indicated at 26, and longitudinally slotted at its opposite end, as indicated at 27. The slot 27 receives a pin 28 on a rack bar 29 arranged to slide vertically in a guideway formed in a bracket 30 secured to the platform at the end opposite that to which the main operating levers are pivoted. It will be seen and understood that a rack bar is provided for each lever 25, and these bars are adapted to be adjusted in unison by pinions 31 on a transverse operating shaft 32 journaled in bearings 33 on the brackets or members of the adjacent end rail, which shaft is provided with a crank portion 34 by which it may be operated. Arranged below each main elevating or operating lever 25 is a pair of auxiliary operating levers 35, pivoted at 36 to the respective portions of the side rails, the inner ends of said levers being reduced to provide portions 37 extending downwardly at an oblique angle and pivotally and slidably engaging a stirrup or loop 38 carried by a bracket 39 on the main operating lever, whereby said auxiliary levers are adapted to swing upon the up and down movement of the main lever, the sliding connection of the angularly bent ends 37 permitting adjustment of the auxiliary levers to compensate for variations in the length of the platform. One or both of the pinions 31 is slidably mounted on the shaft 32 to compensate for variations in the width of the platform, the pinion having a rectangular bore to engage a corresponding portion 32' of the shaft, so that it will turn with the shaft and may yet freely slide thereon. The outer ends or arms of the levers 35 beyond their pivotal connections are formed with recesses 39' to receive the lower ends of the posts 20.

By the construction described it will be apparent that when the levers 25 are elevated the inner ends of the levers 35 will swing upward therewith, thus depressing the outer ends of said levers 35 and allowing the posts 20 to drop to a lowered position by gravity, and that on the contrary when the levers 25 are swung downwardly the inner ends of the levers 35 will be depressed, thus elevating the outer ends thereof, which will force the posts 20 upwardly to raise or jack the vehicle. The up and down motion of the rack bars transfers corresponding motion to the levers 25 through the pins 28, which are free to slide in the slots 27 to allow the platform to be adjusted longitudinally without interference with the lever mechanism. The posts 20 may, of course, be forced downwardly by the action of the spring or connected directly with the levers 35.

It will be understood that the vehicle may be supported upon the platform to relieve the tires of wheels from the weight of the vehicle when not in use and for convenience in cleansing, repairing or painting it, and may be jacked up through the use of the elevating mechanism to enable the wheels to be removed for repairs of various kinds or lubrication of the axle spindles. The platform is mounted upon caster wheels 40 disposed at the corners thereof, and on which the device may be swung around in all directions to bring the different portions of the vehicle into a better lighted portion of the shop, barn or garage or to admit of more convenient access thereto.

In order to lock the lever mechanism in adjusted position to hold the jack posts elevated and maintain the same in elevated position against the weight and pressure of the supported vehicle, L-shaped locking bolts 41 are slidably mounted in ways at the corners of the platform. The horizontal arms of these bolts are movable outwardly to engage the main operating levers 25 to hold the same depressed, while the vertical arms of said posts project upwardly from the platform and form handles 42, whereby said bolts may be conveniently projected and retracted.

A handle of any preferred type, preferably detachably connected with the platform, may be provided in practice for convenience in drawing, pushing or manipulating the support after the manner of a truck.

Having thus described the invention, what is claimed as new, is:—

1. A vehicle supporting device comprising a platform capable of longitudinal and lateral adjustability, jacks at the corners of the platform, means for simultaneously adjusting said jacks, and common operating means for said adjusting means.

2. A vehicle supporting device comprising a platform composed of sections adjustably connected to allow the platform to be varied in length and width, operating means for adjusting the platform, vertically movable jacks at the corners of the platform, and means for adjusting said jacks in unison, said means being adapted to permit of the adjustment of the platform without interference therewith.

3. A vehicle supporting device comprising a laterally and longitudinally adjustable platform, jacks on the platform, and means for simultaneously adjusting the jacks, said means being adapted to permit of the adjustment of the platform without interference therewith.

4. A vehicle supporting device comprising a longitudinally and laterally adjustable platform, jacks at the corners of the platform, adjusting levers on the sides of the platform for operating the jacks, and operating mechanism at an end of the platform for actuating said levers, said levers and operating mechanism being adapted for adjustment of the platform both longitudinally and laterally without interference therewith.

5. A vehicle supporting device comprising a longitudinally and laterally adjustable platform, adjusting means therefor, jacks at the corners of the platform, each having a main and an outwardly projecting auxiliary support to receive and hold a vehicle spindle, and means for adjusting the jacks in unison, said means being adapted to permit of the adjustment of the platform.

6. A device of the character described comprising a platform composed of sections adjustably connected to render the platform extensible as to length and width, means for adjusting the platform, vertically movable jacks at the corners of the platform, lever mechanism for simultaneously adjusting the jacks, said mechanism being adapted to permit of the longitudinal and transverse adjustment of the platform without interference, and operating means for actuating the lever mechanism.

7. A vehicle supporting device comprising a platform, vertically movable jacks at the corners of the platform, main operating levers, auxiliary levers for actuating the jacks, said levers being connected in pairs to the main levers, and means for operating the main levers.

8. A vehicle supporting device comprising a platform, vertically movable jacks at the corners of the platform, main operating levers, auxiliary operating levers controlling the jacks and pivoted to the main operating levers, racks operatively connected with the main operating levers for raising and lowering the same, and means for actuating the racks.

9. A vehicle supporting device comprising a longitudinally and laterally adjustable platform, vertically movable jacks at the corners of the platform, main operating levers, auxiliary operating levers for controlling the jacks, said auxiliary levers being pivoted to the platform and pivotally connected with the main levers, racks operatively engaging the main levers for raising and lowering the same, and an operating shaft having pinions engaging the racks, the parts being adjustably connected in a suitable manner to allow a proper shifting movement of the described mechanism for actuating the jacks to compensate for the adjustments of the platform.

In testimony whereof, I affix my signature in presence of two witnesses.

MARK N. DAVIS.

Witnesses:
JOHN R. HOOPER,
C. A. NICHOLSON.